United States Patent [19]
Burgener et al.

[11] Patent Number: 5,697,291
[45] Date of Patent: Dec. 16, 1997

[54] METHOD AND APPARATUS FOR MICROWAVE ENHANCED PASTEURIZATION AND ENZYME INACTIVATION OF CONTINUOUSLY FLOWING PRODUCT

[75] Inventors: Paul Burgener, Ontario, Canada; Angelo Grillo, Boca Raton, Fla.; Lorne Roberts, Ontario, Canada

[73] Assignees: Questron Inc.; Florida Department of Citrus, both of Lakeland, Fla.

[21] Appl. No.: 441,212

[22] Filed: May 15, 1995

[51] Int. Cl.$^6$ .................. A61L 2/00; H05B 6/80; H05B 6/68
[52] U.S. Cl. .................. 99/451; 99/483; 99/452; 99/453; 426/241; 426/521; 422/21; 422/307; 165/65
[58] Field of Search .................. 426/241, 522; 99/451, 483, DIG. 14, 452, 453; 219/772; 422/21, 22, 285, 307; 165/65

[56] References Cited

U.S. PATENT DOCUMENTS

| | | |
|---|---|---|
| Re. 30,780 | 10/1981 | Stenstrom . |
| 2,517,569 | 8/1950 | Huzenlaub . |
| 2,833,657 | 5/1958 | Copson . |
| 3,092,503 | 6/1963 | Gray . |
| 3,289,569 | 12/1966 | Frolich . |
| 3,706,631 | 12/1972 | Falk .................. 426/241 X |
| 3,814,680 | 6/1974 | Wood .................. 426/241 X |
| 4,014,383 | 3/1977 | Stolt .................. 165/95 |
| 4,409,451 | 10/1983 | Smith .................. 99/451 |
| 4,534,282 | 8/1985 | Marinoza .................. 99/451 |
| 4,731,250 | 3/1988 | Stark .................. 426/234 |
| 4,808,783 | 2/1989 | Stenstrom .................. 99/451 X |
| 4,839,142 | 6/1989 | Charm .................. 422/21 |
| 4,839,485 | 6/1989 | Koch et al. .................. 422/21 X |
| 4,896,005 | 1/1990 | Skubich .................. 99/451 X |
| 4,904,835 | 2/1990 | Koch et al. .................. 99/DIG. 14 X |
| 4,956,532 | 9/1990 | Koch .................. 99/451 X |
| 4,975,246 | 12/1990 | Charm .................. 422/21 |
| 5,049,400 | 9/1991 | Hayden .................. 426/237 |
| 5,066,503 | 11/1991 | Ruozi .................. 926/234 |
| 5,074,200 | 12/1991 | Ruozi .................. 99/451 |
| 5,288,471 | 2/1994 | Corner .................. 422/307 |
| 5,333,539 | 8/1994 | Hurley et al. .................. 99/403 |
| 5,334,402 | 8/1994 | Ovadia .................. 426/241 |
| 5,389,335 | 2/1995 | Charm et al. .................. 426/241 X |
| 5,403,564 | 4/1995 | Katschnig et al. .................. 426/247 X |
| 5,514,389 | 5/1996 | Nikdel .................. 426/231 |

FOREIGN PATENT DOCUMENTS

| | | |
|---|---|---|
| 200904 | 5/1985 | European Pat. Off. . |
| 497099 | 1/1991 | European Pat. Off. . |
| 2569538 | 8/1985 | France . |
| 4126060 | 4/1992 | Japan . |
| 5067327 | 3/1993 | Japan . |
| 2193624 | 2/1988 | United Kingdom . |
| WO 95/00179 | 1/1995 | WIPO . |
| WO 96/11591 | 4/1996 | WIPO . |

OTHER PUBLICATIONS

*Microwave Sterilization* by Linda Hartfinger, Food Technology, Dec. 1992, pp. 57–60.
*Microwave System For Continuous Pasteurization of Orange Juice* by Nikdel and MacKellar, Proc. Fla. State Hort. Soc. 105:108–110, 1992.
*Florida Citrus Juice From Concentrate Production, Packaging & Distribution*, Dec. 6, 1990, Robert Carter, pp. 1–25.

Primary Examiner—Reginald L. Alexander
Attorney, Agent, or Firm—Allen, Dyer, Doppelt, Milbrath & Gilchrist, P.A.

[57] ABSTRACT

A method and apparatus is provided for pasteurizing and inactivating a continuously flowing product without scorching the product. Microwave heating is used to gradually raise the temperature of the fluid up to the pasteurization or inactivation temperature. Preferably, the fluid is preheated to a temperature within a few degrees of the pasteurization or inactivation temperature. Surface conductive heating and heat regeneration can be used for economically preheating the fluid.

18 Claims, 7 Drawing Sheets

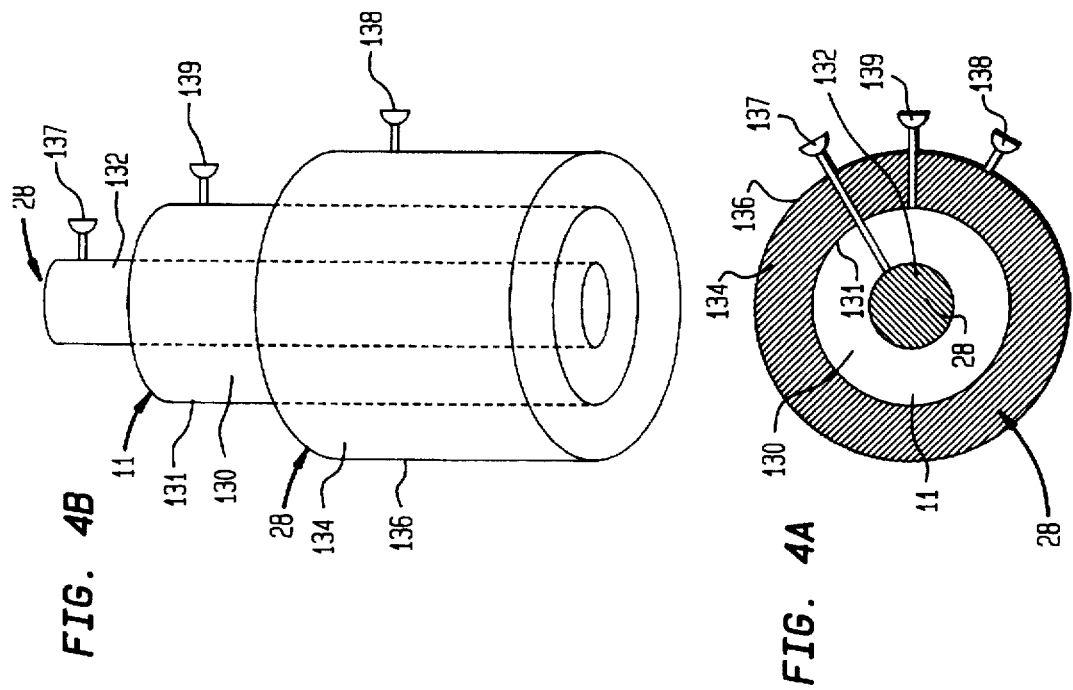
FIG. 4B
FIG. 4A
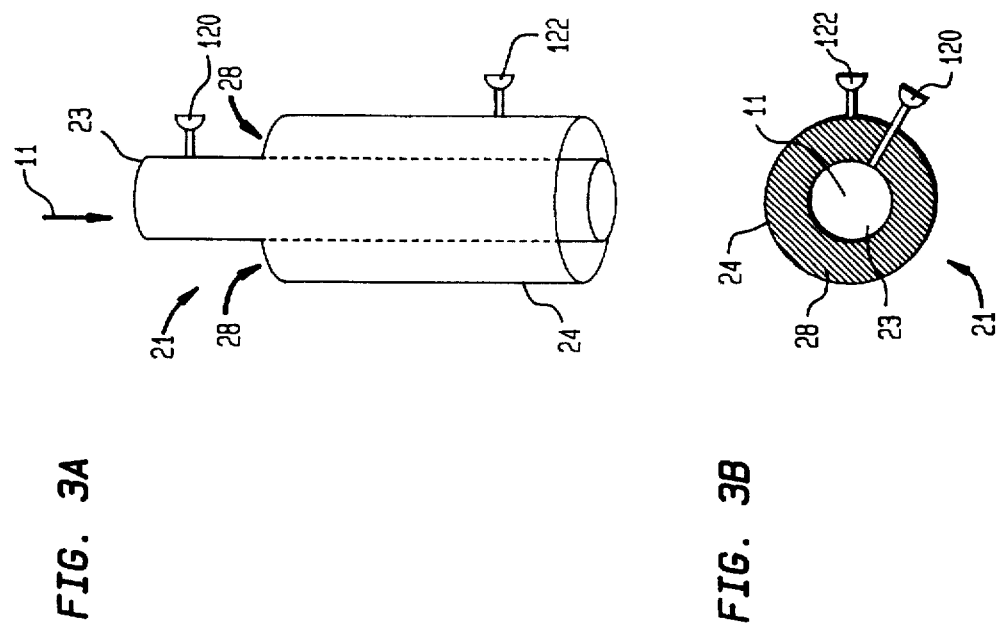
FIG. 3A
FIG. 3B

FIG. 5A
FIG. 5B
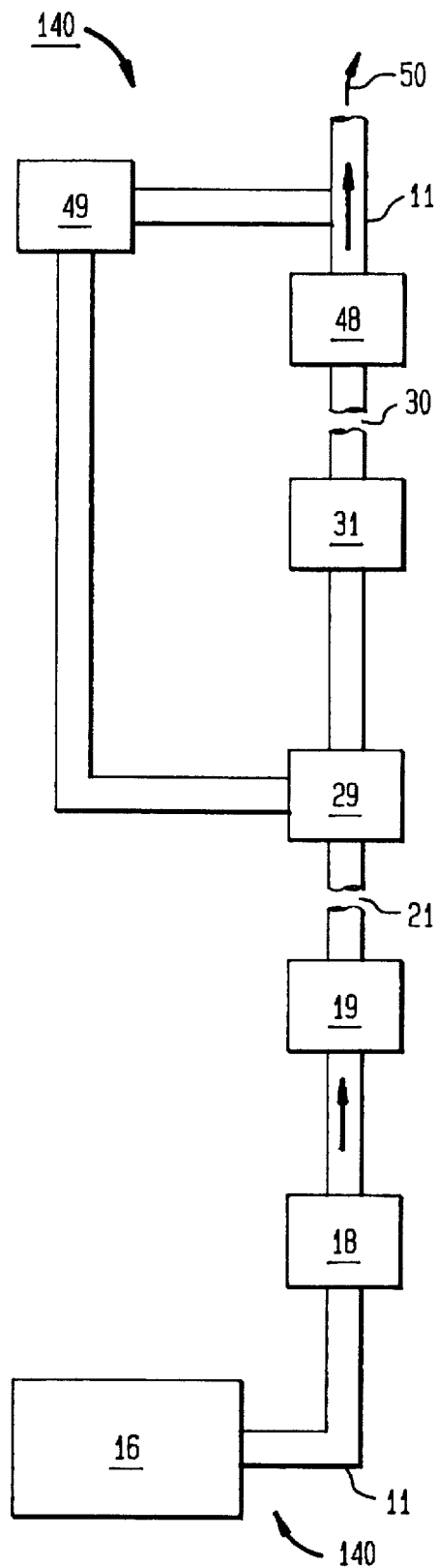
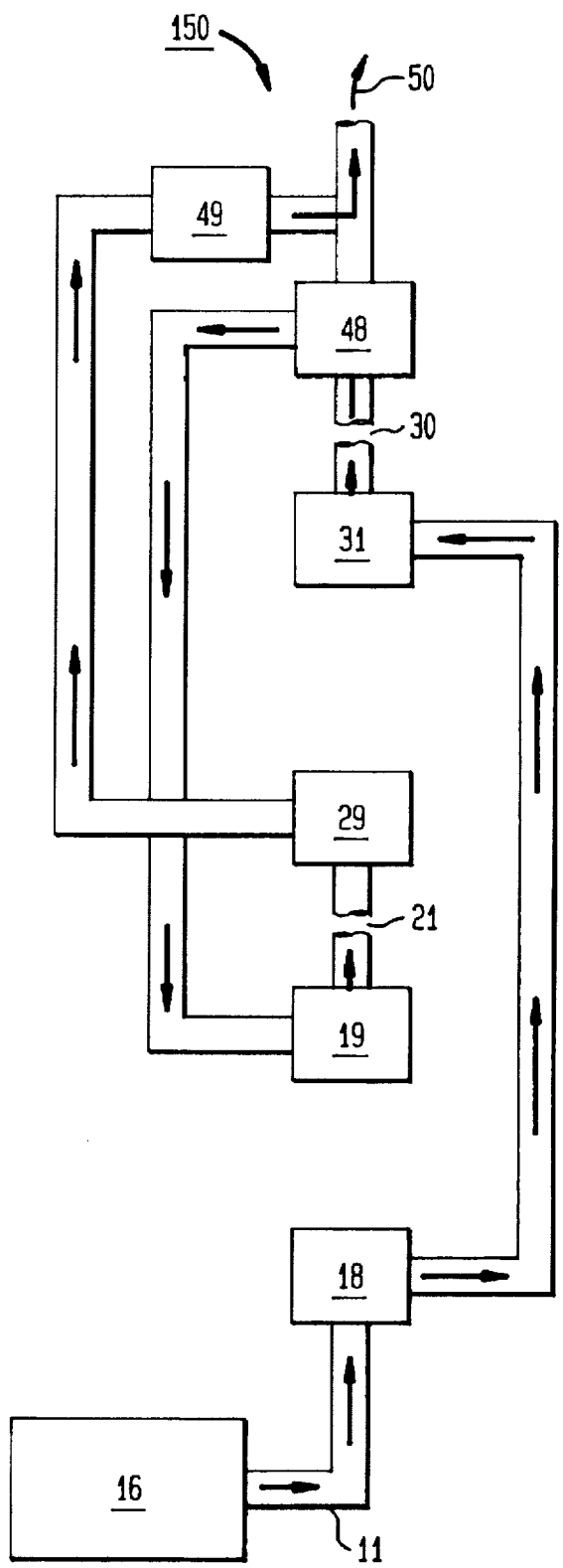

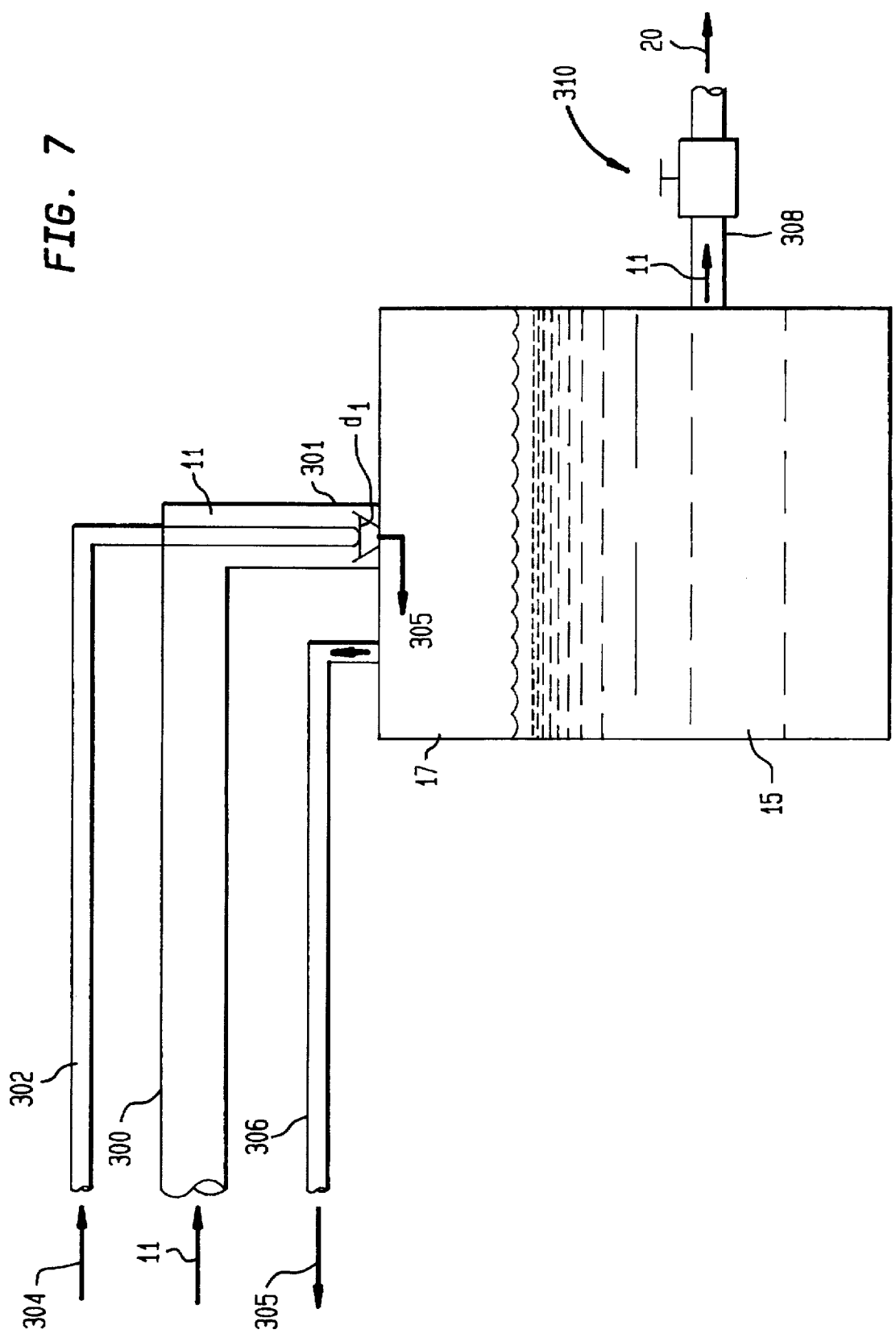

5,697,291

METHOD AND APPARATUS FOR MICROWAVE ENHANCED PASTEURIZATION AND ENZYME INACTIVATION OF CONTINUOUSLY FLOWING PRODUCT

BACKGROUND OF THE INVENTION

1. Field of the Invention

This invention relates to a method and apparatus for pasteurization and enzyme inactivation of a continuously flowing product using three forms of heating. The product can be preheated with heat regenerated from the pasteurized and enzyme inactivated product and surface conductance heat before gradually heating the product to the pasteurization and enzyme inactivation temperatures with microwave energy.

2. Description of the Related Art

Continuous flow pasteurization or enzyme inactivation has conventionally been performed by passing a product through pipes which are heated by steam or hot water. The problems associated with these systems are well known, as described by Robert D. Carter in a publication entitled "Florida Citrus Juice From Concentrate", Florida Department of Citrus, Lakeland, Fla., Dec. 6, 1990. For example, turbulence within the pipe prevents some of the product from making sufficient contact with the surface of the hot pipe, thereby resulting in failure to satisfactorily pasteurize the product within the pipe resulting in reduced shelf life of the product.

It is known that irregular turbulence also results in some portions of the product being scorched because the product has too much contact with the surface of the heated pipe, as described in a publication entitled "A Microwave System For Continuous Pasteurization of Orange Juice", Nikdel and MacKellar, Proc. Florida State Hort. Soc., 105:108–110 (1992). Scorching has the disadvantage of destroying the flavor of food products and reducing their market acceptance.

Microwaves have been employed for pasteurization or sterilization of juices, milk, foodstuffs, biological substances and other products. Conventional microwave devices have been used with packaged products, batch microwave processes or products heated exclusively by microwaves at peak power. One typical conventional automated microwave system which relies exclusively on microwaves to heat prepackaged foodstuff is described in the article entitled "Microwave Sterilization, Food Technology", pp. 57–60 (December 1992). In conventional devices, microwaves are generally employed as the exclusive source of heat energy. These systems have the drawback of being too expensive for pasteurization or inactivation of a bulk product at commercially feasible high flow rates.

U.S. Pat. No. 5,074,200 describes a system for sterilizing foodstuffs utilizing microwaves in which foodstuff packaged in a material transparent to microwaves is conveyed continuously through a pressurized environment. The product is heated to a pre-determined temperature at high speed in a first step. A second step involves further application of less intense microwaves. A third step maintains the temperature with continued circulation of hot air. This patented technique has the shortcoming of requiring a pre-packaged sample and, thus, being expensive and impractical to process large quantities of a fluid product.

Microwave energy has also been applied to solid food and pharmaceutical products, as described in U.S. Pat. No. 4,956,532. In this system, heating is limited to microwave heating of packaging. In addition, this patent describes a programmed microwave system which releases microwaves in response to a sensor. The teachings of this patent have the limitation of being useful only in a system where the products are pre-packaged.

Continuous microwave heating has been disclosed in U.S. Pat. No. 4,896,005. As with the other systems described above, this system uses microwaves solely for heating at peak power and teaches that the product is packaged before the heating procedure can be carried out.

U.S. Pat. No. 5,288,471 relates to a two stage heating process. The product is heated in a tank to a temperature proximate to the maximum temperature for treatment. An electromagnetic source with a temperature probe is used as a temperature detector for maintaining the product at a substantially constant temperature for a set period of time. The radiation energy and the irradiation temperature are chosen so as to raise the temperature of the product to a maximum temperature of 50° C. for avoiding changing the organic and organoleptic qualities of the product. This technique has the shortcoming that by conventional thermal methods for heating the product can be heated unevenly.

Of possible general relevance to the present invention are U.S Pat. Nos. RE 30,780; 4,808,783 and 4,409,453 related to microwave heating systems.

It is desirable to provide a system for efficiently and precisely pasteurizing a continuously flowing product without scorching the product.

SUMMARY OF THE INVENTION

Briefly described, the present invention relates to a continuous flow thermal pasteurization and enzyme inactivation method and apparatus for economically and precisely raising the temperature of the flowing fluid to a point at which bacteria and enzymes are inactivated. The flowing fluid is preheated to a temperature within several degrees of the pasteurization or inactivation temperature. Preferably, the fluid is preheated with heat regenerated from the pasteurization or inactivation product which substantially reduces the energy requirements of the system and makes the system economically advantageous. The fluid can also be preheated with surface conductance from a heated vapor, heated liquid or a heated element for providing an inexpensive means of heating the product to a safe temperature which is below the temperature at which damage can occur in the fluid. In the final stage, the preheated fluid is gradually heated with microwave heating to the pasteurization or inactivation temperature for precisely and evenly controlling the temperature of the fluid in order to preserve the product's original flavor and vitamin content. The combination of heating systems economically provides pasteurization and enzyme inactivation of the product without scorching the fluid.

Preferably, the microwaves are applied to the fluid through the forced absorption of energy over substantially long lengths of product tubing. The tubing is serpentined through the field to ensure an even application of energy to all parts of the product. The tubing cross section is small compared to the absorption penetration depth of energy to maintain uniform microwave fields in the product. The applicator is closely matched to the generator through continuous absorption of power such that standing waves are generally eliminated and accordingly high power nodes which could lead to microenvironmental overheating. The applicator provides both a gradual increase of temperature throughout all portions of the product and a significant amount of time for conduction to occur between successive applications of energy.

The present invention will be more fully described by reference to the following drawings.

BRIEF DESCRIPTION OF THE DRAWINGS

FIG. 3A is a top view of a double tube configuration for the heat regeneration system of the apparatus of the present invention.

FIG. 3B is an end view of the double tube configuration shown in FIG. 3A.

FIG. 4A is a top view of an alternate embodiment of a triple tube configuration of the heat regeneration system.

FIG. 4B is an end view of the triple tube configuration shown in FIG. 4A.

FIG. 5A is a block diagram of a valve system used in the present invention.

FIG. 5B is a block diagram of an alternative diverted valve system used in the present invention.

FIG. 7 is a schematic diagram of an inert gas purging tank used in the present invention.

DETAILED DESCRIPTION OF THE PREFERRED EMBODIMENT OF THE INVENTION

During the course of this description like numbers will be used to identify like elements according to the different figures which illustrate the invention.

Figure 1:
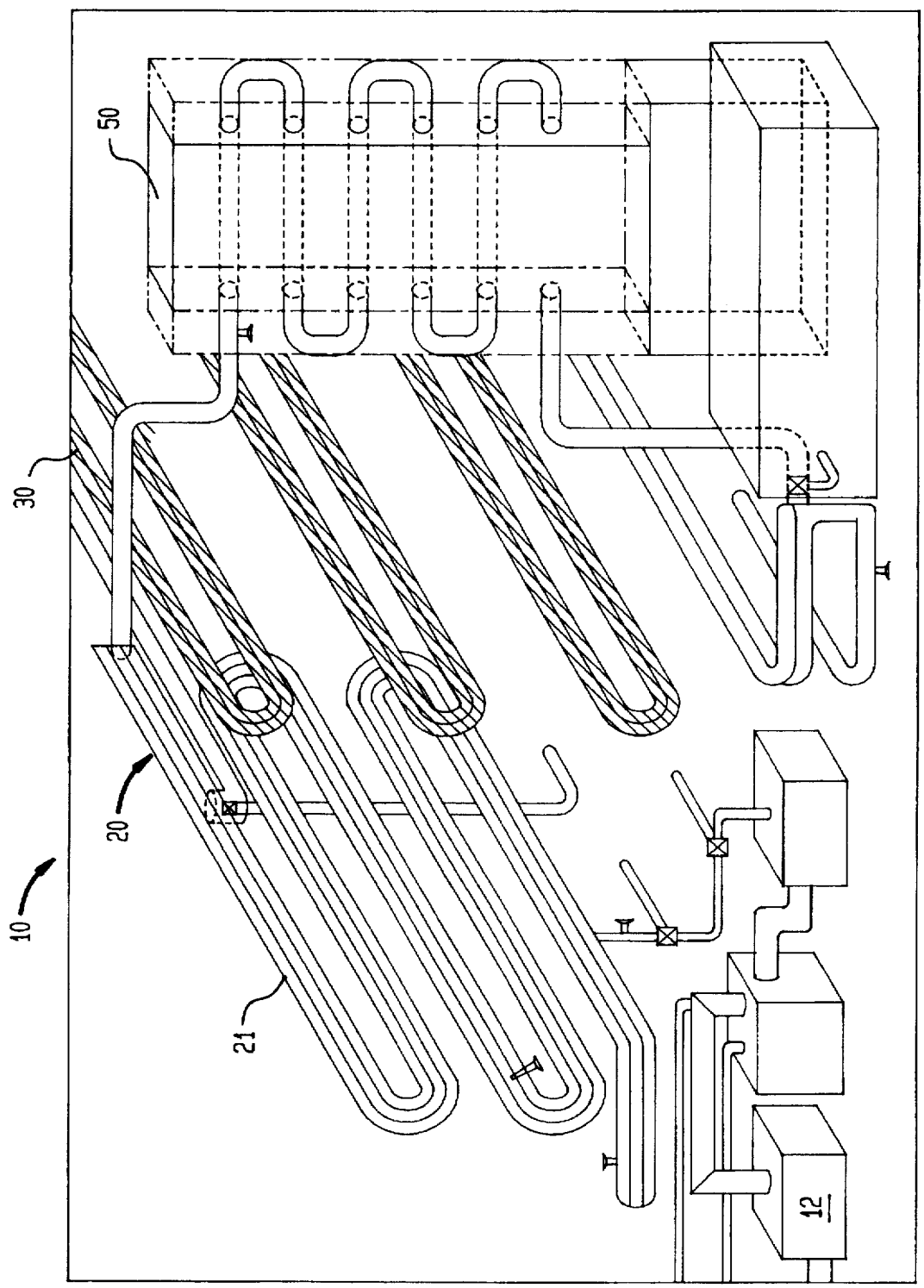
FIG. 1 is a perspective view of the apparatus of the present invention.

FIG. 1 is a perspective view of an apparatus for performing thermal pasteurization and enzyme inactivation 10 in accordance with the teachings of the present invention. The apparatus for performing thermal pasteurization and enzyme inactivation 10 is formed of input system 12, preheating system 20 and microwave heating system 50. In a preferred embodiment preheating system 20 includes heat regeneration system 21 and surface conductance heating system 30.

Figure 2:
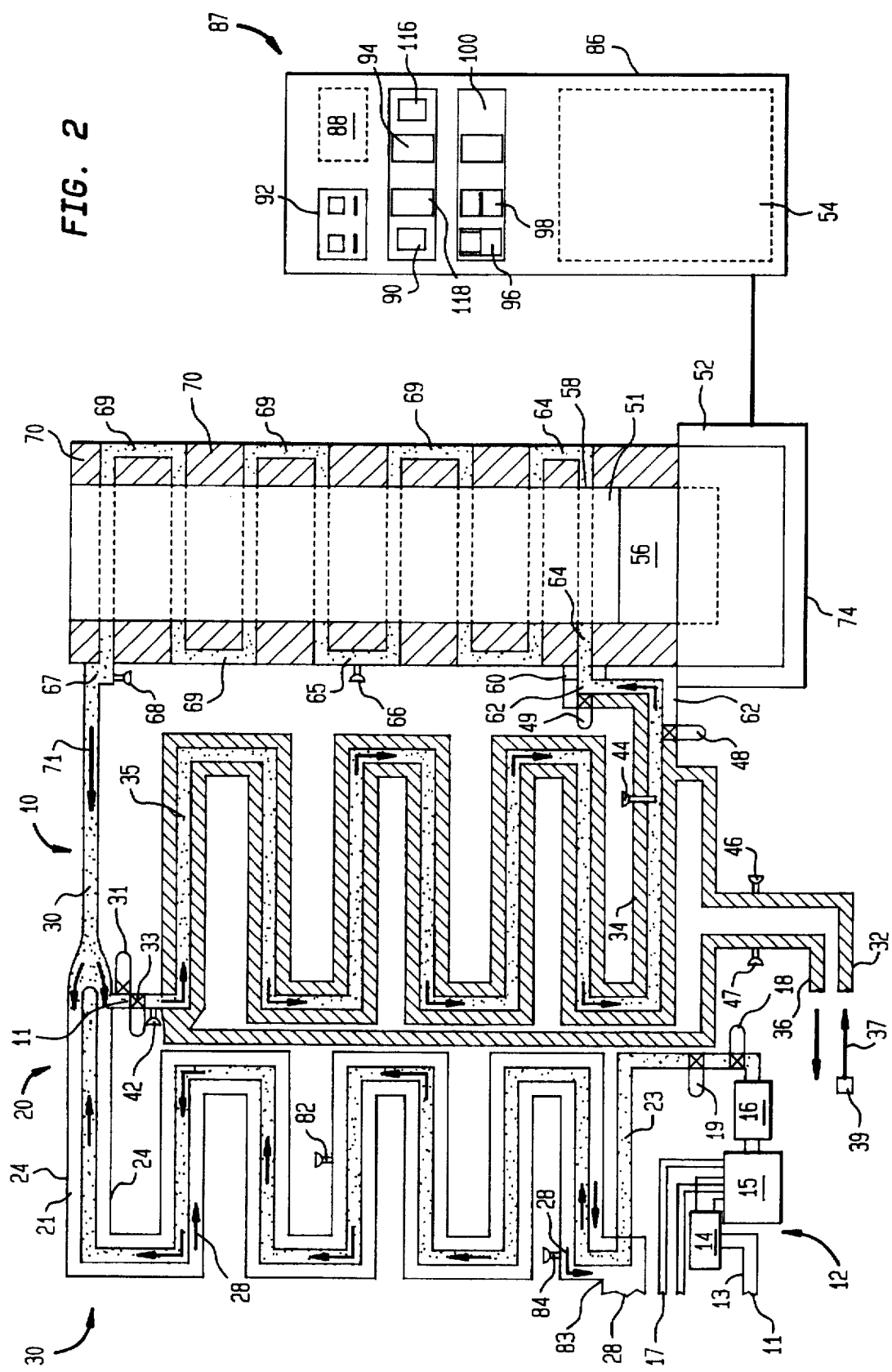
FIG. 2 is a schematic diagram of the apparatus shown in FIG. 1 including monitors and controls.

Input system 12 includes fluid input 13 for receiving fluid 11, as shown in FIG. 2. Fluid 11 is a product to be pasteurized which preferably can be a juice concentrate, milk, or a biological fluid. It will be appreciated that fluid 11 can be other products to be pasteurized without scorching of the product.

Purging pump 14 introduces fluid 11 into purging tank 15. Preferably, purging pump 14 pumps fluid 11 into purging tank 15 in the form of a fine spray. Inert gas purging system 17 can be used to remove oxygen from fluid 11 for maintaining flavor, vitamin content and other nutrient values in fluid 11.

Process pump 16 pumps fluid 11 from purging tank 15 through valves 18, 19 into preheating system 20 and through microwave system 50. Preferably, fluid 11 flows at a rate in the range of about 5 to about 300 gal/min. Fluid 11 is received in inner tube 23 of heat regeneration system 21. Pasteurized or inactivated outgoing product 28 which exits from microwave system 50 is regenerated into shell 24. Shell 24 surrounds inner tube 23 so that pasteurized outgoing product 28 contacts inner tube 23 for heating fluid 11 and cooling pasteurized or inactivated outgoing product 28.

Fluid 11 flows from heat regeneration system 21 through diverting valve 31 into surface conductance heating system 30. Fluid 11 enters surface conductance heating system 30 through inner tube 35 at point 33. Surface conductance heating system 30 is heated by heated fluid 37. Heated fluid 37 can be a vapor, liquid or element which enters at input line 32, circulates through an outer shell 34 and exits surface conductance heating system 30 through exit line 36. Outer shell 34 surrounds inner tube 35 in order to conduct heat from heated fluid 37 to fluid 11.

Sensor 42 measures and controls the input temperature of fluid 11 in inner tube 35. Preferably, the input temperature to surface conductance heating system 30 of fluid 11 is in the range of about 130° F. to about 150° F. Sensor 44 measures and controls the output temperature from surface conductance heating system 30 of fluid 11 in input tube 35. Preferably, the output temperature of fluid 11 is in the range of about 174° F. to about 184° F. which is preferably in the range of about 15° F. to about 3° F. below the pasteurization and inactivation temperature. Input temperature of heated fluid 37 from input line 32 to outer shell 34 is measured and controlled with sensor 46 and the output temperature of heated fluid 37 passing through outer shell 34 to exit line 36 is measured and controlled with sensor 47. Preferably, sensors 42, 44, 46 and 47 are thermocouple or infra-red sensors for feeding back signals to heat source 39 for maintaining fluid 11 and heated fluid 37 in the above described ranges.

Product 11 flows from inner tube 35 of surface conductance heating system 30 through diverting valves 48 and 49 into microwave heating system 50. Microwave heat is generated in microwave heating system 50 by microwave source 52. Typically, about 50 kW of energy is required to produce a temperature differential of about 20° F. at a flow rate of about 15 gal/min. Microwave source 52 can have a source of electricity equal to 440 volts, 3 phase and 150 amps. Preferably, microwave source 52 is coupled to a transformer 54 having an output of about 20 kV.

Microwaves 51 are emitted from microwave source 52 into circulator dummy load 56 which absorbs excess and reflected energy to prevent damage to microwave source 52. After circulator dummy load 56, microwaves 51 enter microwave applicator 58. Microwave applicator 58 can be a wave guide cavity or microwave antenna. Preferably, a wave guide cavity with a cross section of the order of about 5 inches by about 10 inches is required at about 915 MHz for commercial pasteurization or inactivation applications. It will be appreciated that a smaller size cavity can be used with higher frequencies.

At input point 60 to microwave heating system 50, fluid 11 passes from insulated thermally conductive tubing 62 to microwave transparent tubing 64. Microwave transparent tubing 64 can have a serpentine configuration throughout microwave applicator 58 for gradually applying microwaves 59 to fluid 11. Preferably, transparent tubing 64 has a length of at least 10 feet for precisely distributing microwaves 59 over a predetermined length of tubing for gradual heating.

Microwave transparent tubing 64 can be fabricated from various glass and polymer materials. A teflon material such as perfluroalkoky (PFA) and polyfluroethylne (PTFE) can be used for microwave transparent tubing in order to provide microwave transparency, temperature resistance, inertness and cleanliness. Preferably, for a flow rate of about 15 to about 150 gal/min, microwave transparent tubing 64 has a diameter of from about 0.5 inches to about 2 inches, and the length of tubing 64 is at least ten feet. In alternative embodiments, microwave transparent tubing 64 can be extended by adding a combination of straight and curved sections for increasing the heating capacity of the system.

The input temperature of fluid 11 to microwave heating system 50 before entering microwave applicator 58 is measured and controlled by sensor 44. Sensors 66 and 68 measure and control the temperature at respective points 65 and 67 of microwave applicator 58. U-shaped portion 69 of microwave transparent tubing 64 extends externally of microwave applicator 58 for providing external mounting of sensors 66 and 68 and other probes or devices. Insulation material 70 can cover U-shaped portion 69 for providing insulation without interfering with microwaves 51.

Preferably, the input temperature to microwave heating system 50 at sensor 44 is in the range of about 174° F. to about 185° F. The output temperature from microwave heating system 50 is preferably in the range of about 194° F. to about 210° F. for providing total inactivation of bacteria and enzymes in fluid 11 for pasteurizing fluid 11. Typically, the pasteurization temperature is at least 72° C. and the enzyme inactivation temperature for pectin methyl esterase is at least 90° C. Microwave source 52 can be mounted in a National Electrical Manufacturing Association (NEMA) enclosure 74 for protection of microwave source 52 from the production environment. Controls 87 for microwave heating system 50 can include circuit breaker panel 88, power switch 90, safety indicator light 92, flow controls 94, temperature readouts and controllers 96, microwave power controller 98 and diverting valve module switch 100. Safety indicator light 92 indicates input power to microwave source 52. Electrical utilities 116 and optional controls 118 can also be used with microwave heating system 50. Sensors 44, 66 and 68 can be coupled to microwave source 52 and controls 87 for controlling the above described output temperature from microwave heating system 50. Transformer 54 and controls 87 can be mounted in NEMA enclosure 86. Preferably, the microscopic rate of absorption of microwaves 51 is at an equal or lower rate than the microscopic heat conduction of fluid 11.

Fluid 11 exiting microwave heating system 50 flows through tube 71 to shell 24 of heat regeneration system 21. Sensors 82 and 84 measure the temperatures of product 11 in heat regeneration system 21. Fluid 11 exits heat regeneration system 21 at output 83. Preferably, the temperature of fluid 11 at output 83 is in the range of about 130° F. for refrigeration and packaging of the fluid.

FIGS. 3A and 3B illustrate a double tube configuration for heat regeneration system 21. Pasteurized and inactivated outgoing product 28 flows through shell 24 and fluid 11 flows through inner tube 23. Sensor 120 is coupled to inner tube 23 for measuring the temperature of fluid 11 entering heat regeneration system 21. Preferably, the input temperature of fluid 11 entering heat regeneration system 21 is the ambient temperature of a processing plant which is in the range of about 75° F. to about 100° F. Sensor 122 mounted on shell 24 measures the temperature of pasteurized and inactivated outgoing product 28.

FIGS. 4A and 4B illustrate an alternate embodiment for a triple tube configuration for heat regeneration system 21 in which fluid 11 flows in conduit 130 between inner shell 131 and inner tube 132. Pasteurized and inactivated heated outgoing product 28 flows through inner tube 132 and in conduit 134 between inner shell 131 and outer shell 136. In this embodiment, fluid 11 is surrounded by pasteurized outgoing product 28 for improved conductance of heat energy. Sensors 137 and 138 measure and control the temperature of pasteurized heated outgoing product 28 and sensor 139 measures and controls the temperature of fluid 11.

FIG. 5A illustrates valve system 140 used between heat regeneration system 21 and surface conductance heating system 30. Process pump 16 pumps fluid 11 through valves 18 and 19 and diverting valves 29, 31 and 48 into microwave heating system 50.

FIG. 5B illustrates an alternative diverted valve system 150 in which fluid 11 flows to surface conductance heating system 30 and then to heat regeneration system 21. Fluid 11 is pumped by process pump 16 and is diverted by diverting valve 18 to diverting valve 31 into surface conductance heating system 30. Fluid 11 is diverted with diverting valves 48 and 19 into heat regeneration system 21. Fluid 11 flows from diverting valve 29 through diverting valve 49 into microwave heating system 50.

Figure 6A:
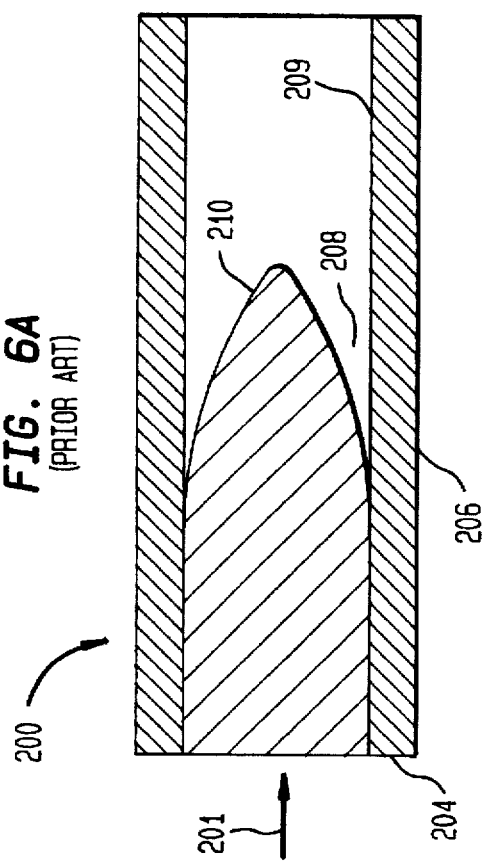
FIG. 6A is a detail cross sectional view of heating with prior art tubing.

FIG. 6A is a cross sectional view of a prior art surface conduction heating system 200 for pasteurization or inactivation of product 201. Inner tube 204 is formed within outer shell 206. Typically, inner tube 204 and outer shell 206 are formed of metal. Product 201 has a slow moving product portion 208 and a fast moving product portion 210. Slow moving product portion 208 is in contact with heating surface 209 for a long period of time which results in scorching of product 201. Scorching of product 201 results in destruction of the flavor and other properties of product 201. Fast moving product section 210 does not adequately contact heating surface 209 resulting in a product which is underheated and does not reach the pasteurization or inactivation temperature resulting in incomplete pasteurization or inactivation. Incomplete pasteurization or inactivation of product 201 results in reduced shelf life. Turbulence in inner tube 204 can be used for improving heat distribution. Turbulence has the disadvantage of being unreliable and yielding incomplete pasteurization or inactivation.

Figure 6B:
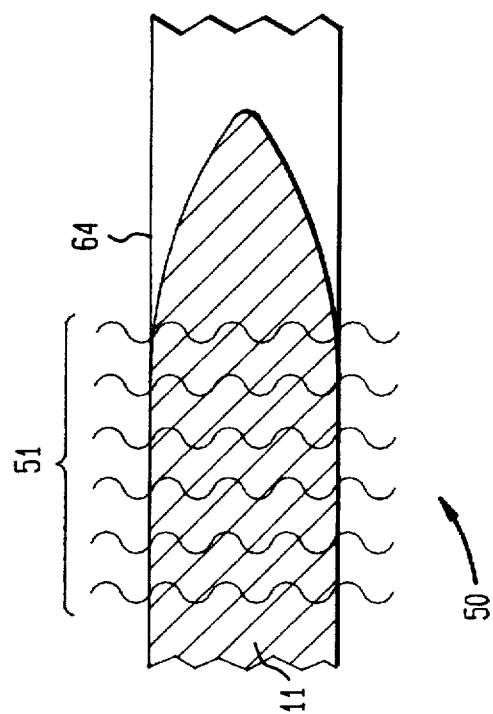
FIG. 6B is a detail cross sectional view of the present invention heating with microwave transparent tubing.

FIG. 6B illustrates a cross sectional view of transparent tubing 64 in which microwaves are applied uniformly throughout fluid 11 for evenly distributing heat in fluid 11, thereby providing complete pasteurization or inactivation without damage to the product resulting in longer shelf life of the product. No scorching of fluid 11 occurs since there is no contact of fluid 11 with hot surfaces.

A schematic diagram of an inert gas purging system 17 which can be used in the apparatus for performing thermal pasteurization or inactivation 10 is illustrated in FIG. 7. Fluid 11 is pumped into purging tank 15 through input line 300 and orifice 301. An inert gas 304 is pumped under pressure through input line 302 and orifice 301. Preferably, inert gas 304 is argon or nitrogen. Orifice 301 has a narrow diameter $d_1$ to cause fluid 11 to mix with inert gas 304 and drive off the oxygen 305 content in fluid 11. Preferably, diameter $d_1$ is in the range of about 0.025 to about 0.75 inches. Oxygen 305 is vented from purging tank 15 through output line 306. Deoxygenated fluid 11 is pumped out of purging tank 15 through line 308 and cut off valve 310 to preheating system 20.

Figure 8:
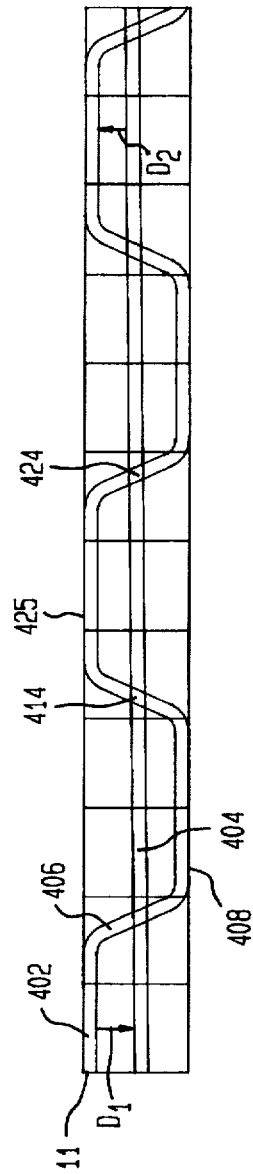
FIG. 8 is a schematic diagram of an alternate embodiment of a microwave heating system.

FIG. 8 illustrates an alternate embodiment for microwave heating system 50 shown in FIG. 1 in a single duct configuration. Microwave heating system 400 includes microwave transparent tubing 402. Microwave transparent tubing 402 initially passes at a distance $D_1$ from higher power microwave field 404 for providing a gradual absorption of power to fluid 11 flowing through transparent tubing 402. Portion 406 is angled for connecting to portion 408 of microwave transparent tubing 402 for applying brief heating in the higher power microwave field 404 before reaching the lower field intensity in portion 408 in which thermal conduction can produce a uniform temperature in fluid 11. Additional intersection portions 414 and 424 of high power microwave field are positioned after intersection portion 404. 414 and 424 can apply additional heating to microwave transparent tubing 402. Duct 425 surrounds microwave transparent tubing 402 and intersection portions 404, 414, 424. As the power is absorbed the distance from the microwave transparent tubing 402 and high power microwave field 404 can be decreased to a distance $D_2$ to provide a gradual increasing temperature rise in fluid 11. A predetermined number of intersections can be used along the length of duct 425 for gradually heating fluid 11.

Figure 9:
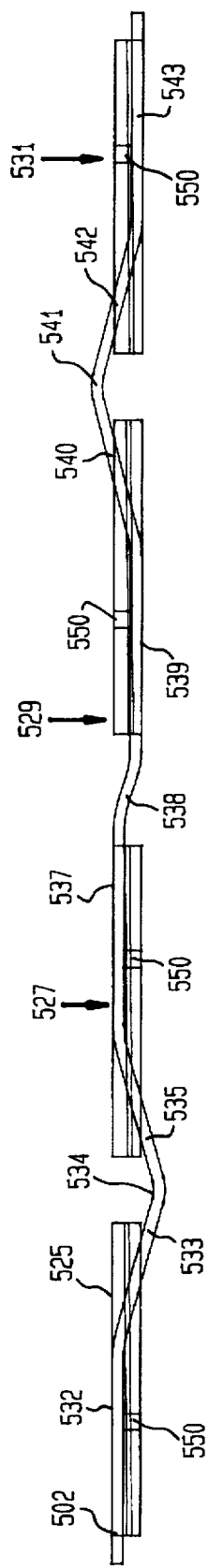
FIG. 9 is a schematic diagram of an alternate embodiment of a microwave heating system including multiple stages of microwave heating.

FIG. 9 is a schematic diagram showing microwave heating system 500 in a multiple duct configuration. Microwave heating system 500 includes a plurality of ducts 525, 527, 529 and 531 surrounding microwave transparent tubing 502. Ducts 525, 527, 529 and 531 and microwave transparent tubing 502 correspond respectively to duct 425 and microwave transparent tubing 402 shown in FIG. 8. Microwave transparent tubing 502 is angled between upper portion 532 and lower portion 533. Coupling portion 534 couples lower portion 533 of duct 525 to lower portion 535 of duct 527. Lower portion 535 is angled to upper portion 537 of duct 527. Coupling portion 538 couples upper portion 537 of duct 527 to lower portion 539 of duct 529. Lower portion 539 is angled to upper portion 540 of duct 529. Coupling portion 541 couples upper portion 540 of duct 529 to upper portion 542 of duct 531. Upper portion 542 of duct 531 is angled to lower portion 543. In this embodiment, microwave transparent tubing 502 alternates from the upper and lower portions of the plurality of ducts for exposing both sides of microwave tubing 502 to microwave power source 550 for providing even heating of fluid 11. The tubing extending in upper portion 532, 537, 540, 542 and lower portion 533, 535, 539, 543 and coupling portions 534, 538 and 541 have a low intensity field to provide a time period for conduction to occur in fluid 11, thereby creating a uniform temperature throughout fluid 11 prior to the tubing entering respective adjacent ducts and absorbing more energy.

The following examples are provided to illustrate the nature of the present invention and are not to be construed as limiting the scope thereof which scope is specifically defined in the appended claims.

EXAMPLE 1

Comparisons of microwave power used in high capacity flow microwave pasteurization or inactivation systems

| | | | Microwave sources in KW | |
|---|---|---|---|---|
| Test | gal/min | Change in Temp F | prior art systems for heating only with microwaves | microwave heating system of the present invention having 3 stages of heating |
| 1 | 15 | 200 | 300 | |
| 2 | 15 | 20 | | 50 |

-continued

Comparisons of microwave power used in high capacity flow microwave pasteurization or inactivation systems

| | | | Microwave sources in KW | |
|---|---|---|---|---|
| Test | gal/min | Change in Temp F | prior art systems for heating only with microwaves | microwave heating system of the present invention having 3 stages of heating |
| 3 | 100 | 200 | 2000 | |
| 4 | 100 | 15 | | 250 |
| 5 | 150 | 200 | 3000 | |
| 6 | 150 | 10 | | 250 |

A comparison was made of the microwave power required for heating a fluid in a particular temperature range, as shown in Table 1. Tests 1, 3, 5 indicate results for prior art microwave heating systems which heat the fluid solely with microwave heating. Tests 2, 4 and 6 indicate results for the apparatus for performing thermal pasteurization or inactivation 10 of the present invention in which preheating with heat regeneration and surface conductance is performed before the step of microwave heating. The results indicate that the microwave power is significantly reduced in tests 2, 4 and 6 compared to respective prior art tests 1, 3 and 5. Reduced microwave power results in reduced operation expense for the present invention.

EXAMPLE 2

Bacteria and Enzyme Inactivation Comparison

| OJ Type | PME Units | CFU/mL |
|---|---|---|
| Raw unpurged OJ (prior art) | 37.5 | $2.56 \times 10^4$ |
| Raw purged OJ (prior art) | 37.5 | $1.49 \times 10^4$ |
| Microwave Pasteurized OJ (of the present invention) | <0.005 | <DL (<200) |

A comparison was performed comparing bacteria and enzyme inactivation for prior art raw unpurged orange juice, prior art raw purged orange juice in which oxygen is removed from the orange juice and pasteurization or inactivation of orange juice with the apparatus for performing thermal pasteurization or inactivation 10 of the present invention.

Colony forming units (CFU) were measured to quantify bacteria in the orange juice. The results indicated that the microwave pasteurized juice of the present invention has a factor of $10^2$ less CFU units indicating a low degree of bacteria in the orange juice. Pectin Methyl Esterase (PME) units were measured to measure the enzymes in the juice. The microwave pasteurized juice of the present invention had a significantly lower enzyme units. Enzymes can cause the orange juice to separate and form solids and are undesirable.

A test panel detected no significant taste difference between prior art raw purged and unpurged orange juice and orange juice pasteurized with the apparatus for performing thermal pasteurization or inactivation of the present invention. After 73 days, the raw unpurged and raw purged orange juice fermented while the microwave pasteurized by the present invention did not ferment and tasted the same.

The present invention has the advantage of gradually heating a continuously flowing fluid to a pasteurization or inactivation temperature in order to prevent scorching of the flowing product. Microwaves are applied to microwave transparent tubing for directly heating the fluid rather than heating the lines transporting the fluid. Preferably, the microwaves are gradually applied to the fluid. Accordingly, in the present invention, fluid does not contact hot surfaces which can result in scorching of the fluid. In addition, a preheating system using surface heat conductance and heat regeneration can be used to raise the fluid to a safe temperature slightly below the pasteurization or inactivation temperature. The preheating system economically heats the fluid, thereby reducing costs.

While the invention has been described with reference to the preferred embodiment, this description is not intended to be limiting. It will be appreciated by those of ordinary skill in the art that modifications may be made without departing from the spirit and scope of the invention.

We claim:

1. An apparatus for performing thermal pasteurization and inactivation of a flowing fluid comprising:
   means for pre-heating the flowing fluid to a temperature below the pasteurization or inactivation temperature;
   microwave means for heating the pre-heated flowing fluid up to the pasteurization or inactivation temperature, said microwave means applying microwave energy to said pre-heated flowing fluid at a rate insufficient to cause a scorching of the fluid, wherein the rate of application of microwave energy prevents localized heating of the fluid before the fluid exits at the pasteurization or inactivation temperature;
   conduit means connecting said means for pre-heating to said microwave means; and
   a plurality of connected tubes having a serpentine configuration positioned in said microwave means and connected to said conduit means;
   wherein the pre-heating means comprises surface conduction heating means for pre-heating fluid with a source of surface conduction heating and heat regeneration means for pre-heating said fluid with a source of heat regenerated from the microwave-heated flowing liquid.

2. The apparatus of claim 1 wherein said conduit means further comprises:
   a conductive tube used in said pre-heating means, said conductive tube being thermally conductive and said plurality of connected tubes in said microwave means for heating being transparent to microwave energy.

3. The apparatus of claim 2 further comprising:
   flow means for controlling the rate of flow of the fluid in said conduit means.

4. The apparatus of claim 3 further comprising:
   temperature control means for controlling the temperature of the fluid in said pre-heating means to a range between 15° F. and 3° F. below the pasteurization or inactivation temperature.

5. The apparatus of claim 4 wherein said source of surface conduction heating is a vapor, liquid or element heated by a thermal or electrical source.

6. The apparatus of claim 5 wherein in said microwave means for heating said fluid flows gradually into a microwave field,
   wherein the microscopic rate of absorption microwave energy is at an equal or lower rate than the rate of the microscopic heat conduction of said fluid.

7. The apparatus of claim 6 wherein said connected tubes being transparent to microwave energy are positioned entirely within said microwave means.

8. The apparatus of claim 7 further comprising means for removing oxygen from said fluid before said pre-heating means.

9. The apparatus of claim 1 wherein said preheating means comprises:
   an inner tube for receiving said fluid, an outer shell surrounds said inner tube, said outer shell receives said microwave heated flowing product.

10. The apparatus of claim 1 wherein said preheating means comprises:
    a first conduit positioned between an inner shell and an inner tube, said inner tube being surrounded by said inner shell, a second conduit positioned between said outer shell and said inner shell, said first conduit receives said fluid and said microwave heated flowing products flows through said inner tube and said second conduit, thereby said fluid is surrounded by said microwave heated flowing product.

11. The apparatus of claim 1 further comprising a valve system for connecting said heat regeneration means to said surface conductance heating means wherein the fluid flows from said surface conductance heating means to said heat regeneration means.

12. The apparatus of claim 1 further comprising a diverted valve system for connected said surface conductance heating means to said heat regeneration means wherein the fluid flows from said surface conduction heating means to said heat regeneration means.

13. An apparatus for performing thermal pasteurization and inactivation of a flowing fluid comprising:
    means for pre-heating the flowing fluid to a temperature below the pasteurization or inactivation temperature, the preheating means comprising surface conductance heating means for preheating the fluid with a source of surface conduction heating; and
    microwave means for heating the pre-heated flowing fluid up to the pasteurization or inactivation temperature, said microwave means applying microwave energy to said pre-heated flowing fluid at a rate insufficient to cause a scorching of fluid, wherein the rate of application of microwave energy prevents localized heating of the fluid before the fluid exits at the pasteurization or inactivation temperature, the microwave means comprising at least one high power microwave field intensity, and said fluid is positioned at a predetermined distance $D_1$ away from said high power field microwave intensity when said fluid enters said microwave means for heating and said fluid flows to a predetermine distance $D_2$ in said microwave means for heating which is closer to said high power microwave field intensity than distance $D_1$, thereby gradually moving the fluid closer to said high power microwave field intensity.

14. An apparatus for performing thermal pasteurization and inactivation of a flowing fluid comprising:
    means for pre-heating the flowing fluid to a temperature below the pasteurization or inactivation temperature, the preheating means comprising surface conductance heating means for preheating the fluid with a source of surface conduction heating; and
    microwave means for heating the pre-heated flowing fluid up to the pasteurization or inactivation temperature, said microwave means applying microwave energy to said pre-heated flowing fluid at a rate insufficient to cause a scorching of the fluid, wherein the rate of application of microwave energy prevents localized heating of the fluid before the fluid exits at the pasteurization or inactivation temperature, the microwave means comprising:

a plurality of ducts;

transparent microwave tubing positioned within each of said ducts;

coupling means for coupling together the transparent microwave tubing of adjacent ducts; and at least one microwave high power field intensity positioned within said duct, wherein in said microwave means for heating said fluid flows gradually into a microwave field, wherein the microscopic rate of absorption microwave energy is at an equal or lower rate than the rate of the microscopic heat conduction of said fluid.

15. A method for performing thermal pasteurization and inactivation of a flowing fluid comprising the steps of:

heating the flowing fluid with microwave energy up to the pasteurization or inactivation temperature, wherein in said heating step said microwave energy is applied at a rate insufficient to cause a scorching of the fluid; and pre-heating the flowing fluid with surface conduction heating with heat regenerated from the heated flowing fluid;

wherein the heating rate prevents localized heating of the fluid before the fluid exits at the pasteurization or inactivation temperature.

16. The method of claim 15 wherein said heating step is performed by gradually flowing said fluid into a microwave field, wherein the microscopic rate of absorption of microwave energy is at an equal or lower rate than the rate of the microscopic heat conduction of said fluid.

17. The method of claim 16 further comprising the step of:

controlling the temperature in said pre-heating step for raising the temperature of the fluid to a range between 15° F. and 3° F. below the pasteurization or inactivation temperature.

18. The method of claim 17 wherein said surface conduction heating is generated by a vapor, liquid or element heated with a thermal or electrical source.

* * * * *